June 8, 1954   J. S. JUDD   2,680,695
PROCESS OF SILVER COATING PLASTIC
Filed Oct. 12, 1948

Inventors
John S. Judd

Patented June 8, 1954

2,680,695

UNITED STATES PATENT OFFICE 2,680,695

PROCESS OF SILVER COATING PLASTIC

John S. Judd, Birmingham, Mich., assignor to Lyon, Incorporated, Detroit, Mich., a corporation of Delaware Application October 12, 1948, Serial No. 54,175

3 Claims. (Cl. 117—35)

This invention relates to a process of making a flexible mirror and more particularly to a process of silver coating flexible plastic sheet to provide a flexible mirror.

An object of this invention is to provide an improved process of making a flexible plastic mirror which lends itself to economical production.

Another object of this invention is to provide a process of silver coating plastic sheet in such manner that the sheet may be readily bent into different shapes without separating the silver deposit from the plastic sheet.

Yet another object of this invention is to provide an improved process of protecting a silver deposit on a transparent flexible plastic sheet and of sealing over and beyond the edges of the deposit on the sheet.

Another object of this invention is to provide an improved flexible mirror with a protective coating on the mirrored deposit extending beyond the edges of the deposit on the carrier for sealing the edges of the deposit to the carrier.

In accordance with the general features of this invention there is provided in a process of making a mirror on a flexible sheet of transparent plastic material, the steps of first applying a silver coating to a portion of the surface of the sheet and thereafter applying over the coating, such as by spraying, a flexible lacquer to protect the silver deposit and to seal over and beyond the edges of the same on the plastic sheet.

A further feature of the invention resides in the use of a protective coating, such as a copolymer of butadiene and styrene, which has the characteristic of firmly adhering, upon drying, to the silver deposit and plastic and which will flex without rupture with the plastic sheet.

Other objects and features of the invention will more fully appear from the following detailed description taken in connection with the accompanying drawing which indicates a single embodiment thereof and in which.

As shown on the drawings.

Figure 1:
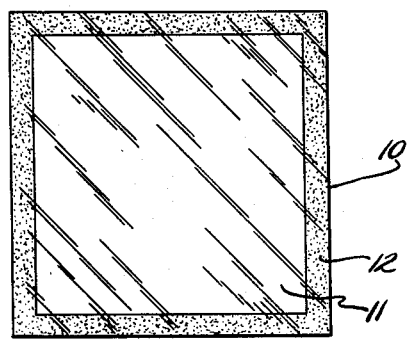
Figure 1 is a diagrammatic front view of a transparent flexible plastic mirror made in accordance with the features of this invention.

The reference character 10 designates generally a thin flexible sheet, which may be of any suitable shape or size, and preferably comprises a sheet of conventional thin transparent resiliently flexible plastic resin. For example, thermoplastic such as ethyl cellulose, cellulose acetate, cellulose acetate butyrate, polystyrene, and vinyl acetate, as well as other plastic resins can be used. Such plastic resins are well known in the art and when in sheet form are resiliently flexible without rupture.

Figure 2:
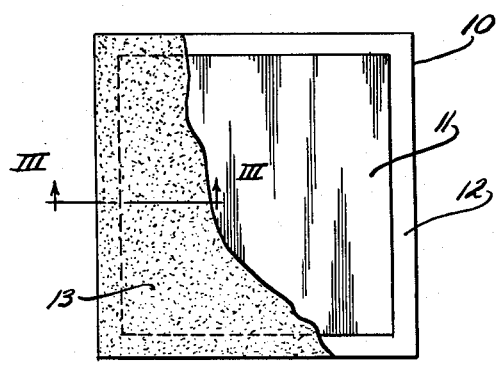
Figure 2 is a rear view similar to Figure 1 partly broken away and showing the protective lacquer over the silver deposit and beyond the edges of the same and sealing off the edges of the deposit onto plastic.

I propose in accordance with the features of this invention to use such a sheet of transparent plastic material as the carrier for a mirror of silver deposit 11 which may be of any suitable shape or extent but is preferably of an area less than that of the surface of the sheet so that a portion of the sheet extends beyond the deposit on all sides of the same, as shown at 12 in Figure 2.

Figure 3:
Figure 3 is a fragmentary cross-sectional view taken on substantially the line III—III of Figure 2, looking upwardly.

In order to protect this mirror or silver deposit 11 the entire sheet is coated with a flexible lacquer 13 which extends beyond the edges of the deposit 11 onto the plastic 12, as shown at 15 in Figure 3. Thus I am enabled to use this lacquer not only to protect the deposit but also to seal off the edges of the deposit on the plastic sheet. I have attained excellent results by using a lacquer such as one prepared with a styrene-butadiene water emulsion as a base and pigmented black. This lacquer is sometimes referred to as a copolymer of butadiene and styrene.

I shall list hereinbelow some of the specific solutions and values used in one successful embodiment of my invention but it is, of course, to be understood that my invention is not to be limited thereby.

First I shall enumerate hereinbelow some of the solutions that I have used and with which I have attained particularly good results in practicing my invention.

Silver nitrate: One gram per 100 cc. distilled water with a few drops of nitric acid to prevent hydrolysis.

Sugar solution:
Distilled water _____ 700 cc.
Granulated sugar _____ 80 gm.
When this is dissolved add 175 cc. alcohol (90% ethanol+10% methanol), 3 cc. nitric acid sp. grav. 1.42 and add distilled water to make 1,000 cc. This solution should be allowed to stand for a week to allow inversion to take place.

Potassium hydroxide solution: One gram of C. P. potassium hydroxide per 100 cc. of distilled water.

All of the above solutions work best at a temperature of about 20° C.

Tin chloride solution: 100 cc. of a concentrated solution of tin chloride diluted to 1,000 cc.

In practicing my invention I have used a number of different commercial types of plastic resins including thermoplastic resins. A typical illustration is cellulose acetate butyrate. The sheet should be relatively thin and resiliently flexible and may be treated in the following noted manner to obtain a satisfactory practicing of my invention.

1. Allow the transparent sheet to soak overnight in distilled water at 20° C. This allows the plastic to absorb some water and makes it much more receptive for a mirror.
2. Clean the sheet by scrubbing the plastic with a cotton swab soaked in 5% potassium hydroxide solution.
3. Rinse in distilled water twice.
4. Rinse in tin chloride solution.
5. Rinse in distilled water once.
6. Lay the sheet out perfectly flat and pour the silvering solution on it. Let this stand for 10 minutes then pour it off and rinse with distilled water.
7. A mirror with greater brilliance is achieved by depositing a second coating. This is done by repeating step #6.
8. The silvering solution is prepared as follows:

(a) To 100 cc. of the silver nitrate solution add dilute ammonia drop by drop until the first precipitate which forms, almost disappears.
(b) Add 50 cc. of the potassium hydroxide solution with stirring.
(c) Add dilute ammonia again drop by drop until the precipitate almost disappears.
(d) To the above, add about 1/25 of its volume of the sugar solution and stir.
(e) Pour the silvering solution thus prepared rapidly on the plastic.

9. After mirroring and rinsing, the mirror may be air dried or force dried in an oven at 180° F.
10. To protect the silver from rubbing off, spray with a type of coating which will not adversely affect the plastic. One type of protective coating I have used successfully is a pigmented butadiene styrene lacquer of the character previously alluded to.
11. After spraying the coating may be air dried or force dried in an oven at 180° F.

After the silvered or mirrored sheet has been dried, it can be readily bent into any shape, such for example, as a cylindrical shape without rupturing or fracturing the coating thereon. Such a mirrored sheet may be used, for example, as a covering for a column where it is desired to ornament the column. It may also be used to advantage in curved show cases and for ornamental and display purposes.

It will be appreciated that only a very small margin of the sheet need be left uncoated with silver, as the portion left unsilvered need only be sufficient for a bond with the protective coating beyond the edge of the deposit. This feature is advantageous as it minimizes the likelihood of the silver coating becoming separated from the plastic on bending of the plastic and also enables complete sealing of the silver deposit.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a process of making a flexible mirror on a flexible plastic resin sheet, the steps of first soaking a transparent water-absorptive plastic sheet in distilled water until the sheet absorbs some water on its surface, cleaning the sheet by scrubbing the same with a potassium hydroxide solution, then rinsing the sheet successively in distilled water and a tin chloride solution, then laying the sheet out in substantially flat form, pouring a silvering solution on a portion of the sheet to be silvered to effect precipitation of a metallic silver deposit thereon, pouring off excess solution after the deposit has formed, rinsing the silvered sheet with distilled water, depositing a second coat of metallic silver on the previous deposit by again pouring a silvering solution on the previous deposit on the sheet to effect precipitation of a second metallic silver deposit thereon and again rinsing with distilled water, drying the silver coated sheet and then spraying over the silver deposit and beyond the margin of the deposit onto the plastic sheet a coating of flexible butadiene-styrene copolymer lacquer to protect the silver deposit and to seal over and beyond the edges of the same onto plastic sheet.

2. In a process of making a flexible mirror on a flexible plastic resin sheet, the steps of first soaking a transparent water-absorptive plastic sheet in distilled water until the sheet absorbs some water on its surface, cleaning the sheet by scrubbing the same with a potassium hydroxide solution, then rinsing the sheet successively in distilled water and a tin chloride solution, then laying the sheet out in substantially flat form, pouring a silvering solution on a portion of the sheet to be silvered to form a metallic silver deposit thereon, pouring off excess solution after the deposit has formed, rinsing the silvered sheet with distilled water, depositing a second coat of metallic silver on the previous deposit by again pouring a silvering solution on the previous deposit on the sheet to effect precipitation of a second metallic silver deposit thereon and again rinsing with distilled water, drying the silver coated sheet and then spraying over the silver deposit and beyond the margin of the deposit onto the plastic sheet a coating of flexible lacquer of a copolymer of butadiene and styrene to protect the silver deposit and to seal over and beyond the edges of the same onto plastic sheet.

3. In a process of making a flexible water-absorptive mirror on a flexible transparent plastic resin sheet, the steps of first soaking the plastic sheet in water until the sheet absorbs some water on its surface, cleaning the sheet with a potassium hydroxide solution, then rinsing the sheet successively in water and a tin chloride solution, then laying the sheet out in substantially flat form, depositing by chemical precipitation a metallic silver coating from a silvering solution on a portion of the sheet to be silvered, pouring off excess solution after the deposit has set, rinsing the silvered sheet with water, and then applying over the silver deposit and over the resin sheet beyond the margins of said silver deposit a coating of flexible butadiene-styrene copolymer lacquer to cover and protect the silver deposit.

References Cited in the file of this patent
UNITED STATES PATENTS

| Number | Name | Date |
|---|---|---|
| 2,063,034 | Freund | Dec. 8, 1936 |
| 2,214,646 | Walker | Sept. 10, 1940 |
| 2,273,613 | Bartoe | Feb. 17, 1942 |
| 2,354,074 | Tandberg | July 18, 1944 |
| 2,355,933 | Weiss | Aug. 15, 1944 |
| 2,390,424 | Colvert | Dec. 4, 1945 |